US012618400B2

(12) United States Patent
Schulz

(10) Patent No.: US 12,618,400 B2
(45) Date of Patent: May 5, 2026

(54) VALVE FOR A PISTON COMPRESSOR, AND METHOD FOR OPERATING SUCH A VALVE

(71) Applicant: BURCKHARDT COMPRESSION AG, Winterthur (CH)

(72) Inventor: Reiner Schulz, Lottstetten (DE)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 18/837,629

(22) PCT Filed: Feb. 10, 2023

(86) PCT No.: PCT/EP2023/053362
§ 371 (c)(1),
(2) Date: Aug. 12, 2024

(87) PCT Pub. No.: WO2023/152324
PCT Pub. Date: Aug. 17, 2023

(65) Prior Publication Data
US 2025/0146482 A1 May 8, 2025

(30) Foreign Application Priority Data

Feb. 10, 2022 (EP) ..................................... 22156044

(51) Int. Cl.
*F04B 39/10* (2006.01)
*F16K 15/10* (2006.01)

(52) U.S. Cl.
CPC ...... *F04B 39/1066* (2013.01); *F04B 39/1053* (2013.01); *F16K 15/10* (2013.01)

(58) Field of Classification Search
CPC  F04B 39/1066; F04B 39/1053; F04B 39/102; F04B 39/10; F16K 15/10; F16K 15/08
See application file for complete search history.

(56) References Cited

U.S. PATENT DOCUMENTS 3,273,591 A   9/1966  Stewart
4,703,772 A   11/1987  Ostermann
(Continued)

FOREIGN PATENT DOCUMENTS

DE        692177 C     6/1940
EP        2851590 A1   3/2015
FR        1061785 A    4/1954

OTHER PUBLICATIONS

National Search Report for EP 22 156 044.4, prepared by the European Patent Office, dated Jul. 5, 2022, 9 pages.
(Continued)

*Primary Examiner* — Marina A Tietjen
(74) *Attorney, Agent, or Firm* — Brooks Kushman P.C.

(57) ABSTRACT

A valve for a reciprocating compressor having a valve seat with a plurality of flow channels which open into an end face of the valve seat; a valve plate having a planar sealing surface which is designed to control the flow channels of the valve seat and has passage openings which are spatially offset relative to the flow channels of the valve seat, at least one projection being arranged on the end face of the valve seat, which projection projects into a passage opening of the valve plate at least in a closed valve state.

13 Claims, 5 Drawing Sheets

(56) References Cited

Figure 1A:
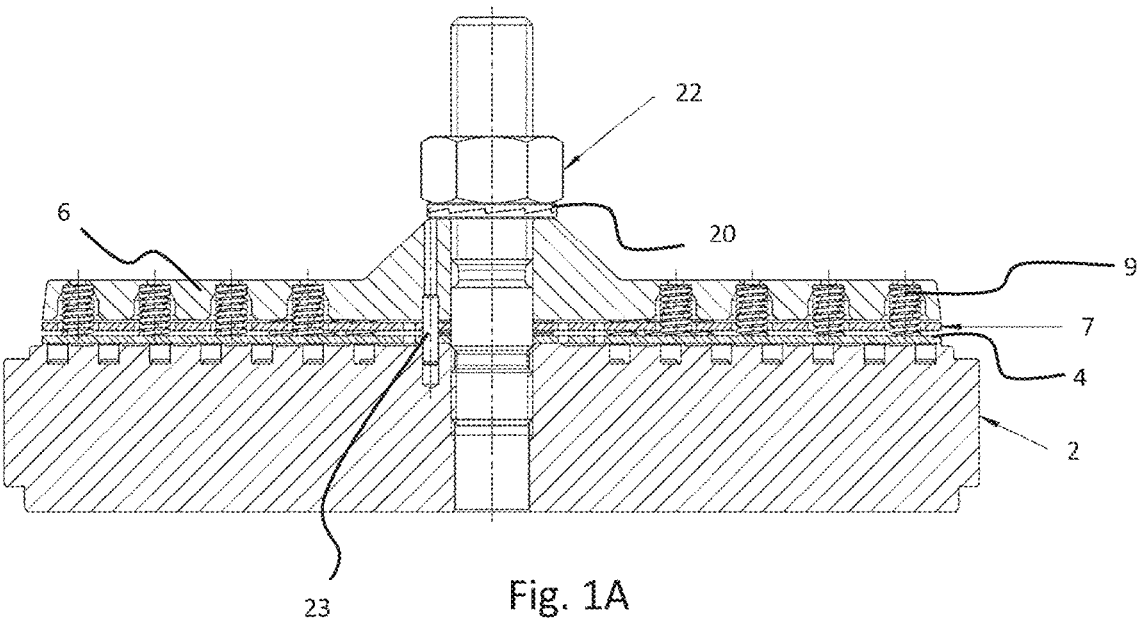

U.S. PATENT DOCUMENTS 5,678,603 A * 10/1997 Tschop ................ F04B 39/1033
137/512.1
2014/0338761 A1 * 11/2014 Babbini .................. F16K 15/08
137/382

OTHER PUBLICATIONS

International Search Report for PCT/EP2023/053362, prepared by
the European Patent Office, dated May 16, 2023, 2022, 13 pages
including English Translation.
European Office Action for European Application 23705220.4 mailed
Aug. 12, 2025. 5 pages.

* cited by examiner

VALVE FOR A PISTON COMPRESSOR, AND METHOD FOR OPERATING SUCH A VALVE

CROSS-REFERENCE TO RELATED APPLICATION

This application is the U.S. national phase of PCT Application No. PCT/EP2023/053362 filed on Feb. 10, 2023, which claims priority to EP Patent Application No. 22156044.4 filed on Feb. 10, 2022, the disclosures of which are incorporated in their entirety by reference herein.

The invention relates to the technical field of reciprocating compressors.

Nowadays, inlet and outlet valves for reciprocating compressors with larger stroke volumes, plate valves with a number of concentrically arranged flow openings are mostly used, which are usually covered by a valve plate made of steel or plastic. With one-piece valve plates, all areas of the plate are forced to move together, which results in a relatively uniform load when opening and closing. However, such plates have disadvantages in terms of flow control and the associated flow losses.

It has already been proposed to provide plate valves with sealing surfaces that are inclined in the direction of flow, both on the valve seat and on the valve plate. This leads to less flow deflection and therefore lower flow losses. Such profiled valve seats and valve plates were described in AT514712A1. However, the valve plates used therein have the disadvantage that in the event of unavoidable, minimal dimensional deviations during manufacture and/or different thermal expansion behavior, small gaps inevitably form in sealing rings with inclined seating surfaces, which only close after the closing pressure is applied due to deformation of the ring. The connecting radial bars between the sealing rings must therefore be specially designed to counteract this undesirable sealing behavior. The production of the sealing plate is complex and cost-intensive.

It is therefore the problem of the present invention to overcome the disadvantages in the prior art. In particular, it is the problem of the present invention to provide a valve for a reciprocating compressor which ensures improved flow control, wherein the valve plate can nevertheless be manufactured simply and inexpensively. This problem is solved by a valve and a method having the features of the independent claims.

The problem is solved in particular by a valve for a piston compressor, comprising
  a valve seat with a plurality of flow channels that open into an end face of the valve seat;
  a valve plate having a planar sealing surface which is designed to control the flow channels of the valve seat;
wherein the valve plate extends in a plane parallel to the end face of the valve seat, is arranged concentrically to the valve seat and has passage openings which are spatially offset relative to the flow channels of the valve seat, characterized in that at least one projection is arranged on the end face of the valve seat, which, at least in a closed valve state, projects into a passage opening of the valve plate.

For the purposes of the invention, a "planar" design of the sealing surface means that the valve plate does not have a profiled sealing surface, in particular does not have a beveled edge of a passage opening towards the valve seat. Typically, the valve plate has no protrusions or indentations at all. The valve plate is particularly preferably formed from a planar substrate, for example a stainless steel sheet, in particular punched, milled or cut. Typically, an angle of essentially 90° is formed therewith between the sealing surface and the walls of the passage openings.

The advantage of the valve according to the invention is that the flow deflection is optimized and flow losses are reduced, which improves the valve efficiency. Nevertheless, the planar valve plate can be manufactured cost-effectively and efficiently. The planar sealing surface of the preferably one-piece valve plate ensures a uniform load during opening and closing across the various areas of the sealing surface. Due to the uniform nature of the surface, the leakage rate can be kept low.

In a preferred embodiment, the valve as described above additionally comprises a catcher, which is arranged such that the valve plate extends between the valve seat and the catcher. The catcher may have recesses, e.g. blind bores, to accommodate springs. The valve as described above may include springs arranged on the catcher to load the valve plate against the face of the valve seat so that the valve is closed when depressurized.

It is preferable that the valve plate and the valve seat each have the shape of an annular plate. It is particularly preferable that the flow channels and the passage openings are each designed as slots in the form of concentric circular arcs when viewed from above.

Plate valves of this type are known in various designs. When such valves are operated, the valve plate performs a lifting movement between the valve seat and the catcher, alternately closing (closed valve state) and opening (open valve state) the flow channels of the valve seat. However, such plate valves tend to suffer flow losses due to the considerable flow deflection between the flow channels and the passage openings. The solution presented here combines the advantages of the plate valve such as uniform load, long life cycle, and high leakage resistance, with improved flow deflection.

In a preferred embodiment, in a closed valve state, the planar sealing surface of the valve plate rests in some areas on the face of the valve seat, with the contact areas extending perpendicular to the flow channels of the valve seat. This design ensures good sealing performance without sealing delay during valve closure. It therefore differs from known valve plates, in which beveled sealing surfaces interact with corresponding, opposing seating surfaces on the valve seat in order to optimize the flow.

Particularly preferred is a valve as described above, additionally comprising an auxiliary plate, preferably a damper plate, extending between the valve plate and the catcher in a plane parallel to the end face of the valve seat, the springs preferably projecting through holes in the auxiliary plate in order to press the valve plate against the end face of the valve seat. The auxiliary plate can have the task of damping the impact of the valve plate on the catcher and/or, if necessary, guiding it during the lifting movement. The former is particularly necessary if the valve plate is made of steel or nickel-based alloy (Hastelloy). Alternatively, a single, non-metallic valve plate can be used instead of a valve plate and an auxiliary plate. Such a plate is typically made of thermoplastic high-performance polymer such as fiber-reinforced PEEK and/or polyimide. Such plates have a higher toughness, impact resistance and resistance to damage from liquids or contamination.

In a preferred embodiment, a large number of projections are arranged on the end face of the valve seat, each of which projects into a corresponding passage opening of the valve plate, at least when the valve is closed. The efficiency-enhancing effect of the flow deflection can be optimized by using at least one projection for each passage opening. It is particularly preferable that, in the valve as described above, the passage openings of the valve plate are designed as circular arc-shaped slots and the projections on the end face of the valve seat are designed as corresponding circular arc-shaped projections. Thus, when the valve is closed, a longitudinal projection, which essentially follows the shape of the passage opening, projects into each passage opening of the valve plate.

In one embodiment, the at least one projection has a cross-section that tapers towards the valve plate, preferably tapering conically, and particularly preferably tapering via concave side curvature. In the case of circular protrusions, a radial cross-section is meant. "Concave side curvature" is understood to mean that the tapering sides have a radius of curvature in cross-section or a variable slope, in particular a slope that increases towards the valve plate.

In one embodiment, the at least one projection is formed in one piece with the valve seat. The at least one projection can be milled or turned from the valve seat, for example. This embodiment has the advantage that the protrusions are particularly durable and inert.

Alternatively, the at least one projection can be made of plastic, preferably PTFE. In this case, the protrusion is connected to the metal valve seat, for example inserted positively or non-positively into a corresponding recess in the valve seat. In a preferred embodiment, the protrusion is an annular or circular arc-shaped piece which is fitted into a corresponding groove on the face of the valve seat. When separate parts are used, the choice of material becomes more flexible and, thanks to the interchangeability, maintenance is simplified, for example over-turning or machining.

One aspect of the invention relates to a method of operating a valve for a reciprocating compressor, wherein the valve comprises a valve seat and a valve plate, wherein the valve seat has a plurality of flow channels which open into an end face of the valve seat, and the valve plate has a planar sealing surface which extends in a plane parallel to the end face of the valve seat, is arranged concentrically to the valve seat and has passage openings which are spatially offset relative to the flow channels of the valve seat, wherein in a closed valve state the valve plate blocks the flow channels and releases them in an open valve state, and wherein the valve plate assumes the open state when it automatically lifts off the valve seat due to a fluid pressure applied to the valve, so that fluid flows through the flow channels of the valve seat and downstream through the passage openings of the valve plate, characterized in that fluid is directed into a passage opening of the valve plate via a projection arranged on the valve plate of the valve seat.

This method also solves the problem described above. The method optimizes the flow deflection and reduces flow losses, thereby improving valve efficiency. Nevertheless, the planar valve plate can be manufactured cost-effectively and efficiently. The planar sealing surface of the valve plate ensures a uniform load during opening and closing across the various areas of the sealing surface. Due to the uniform nature of the surface, fitting inaccuracies are avoided and the leakage rate can be kept low.

It is preferable that, in the method described above, the fluid is directed into a corresponding passage opening of the valve plate via a plurality of projections arranged on the end face of the valve seat. The fluid can be directed into at least one passage opening of the valve plate via at least one projection tapering towards the valve plate, preferably a projection with a tapered cross-section, particularly preferably a projection with concave side curvatures.

One aspect of the invention relates to a piston compressor comprising a valve as described above.

The invention is further illustrated by the figures and the following explanations. The figures show preferred embodiments and do not limit the subject-matter of the invention.

Figure 1B:
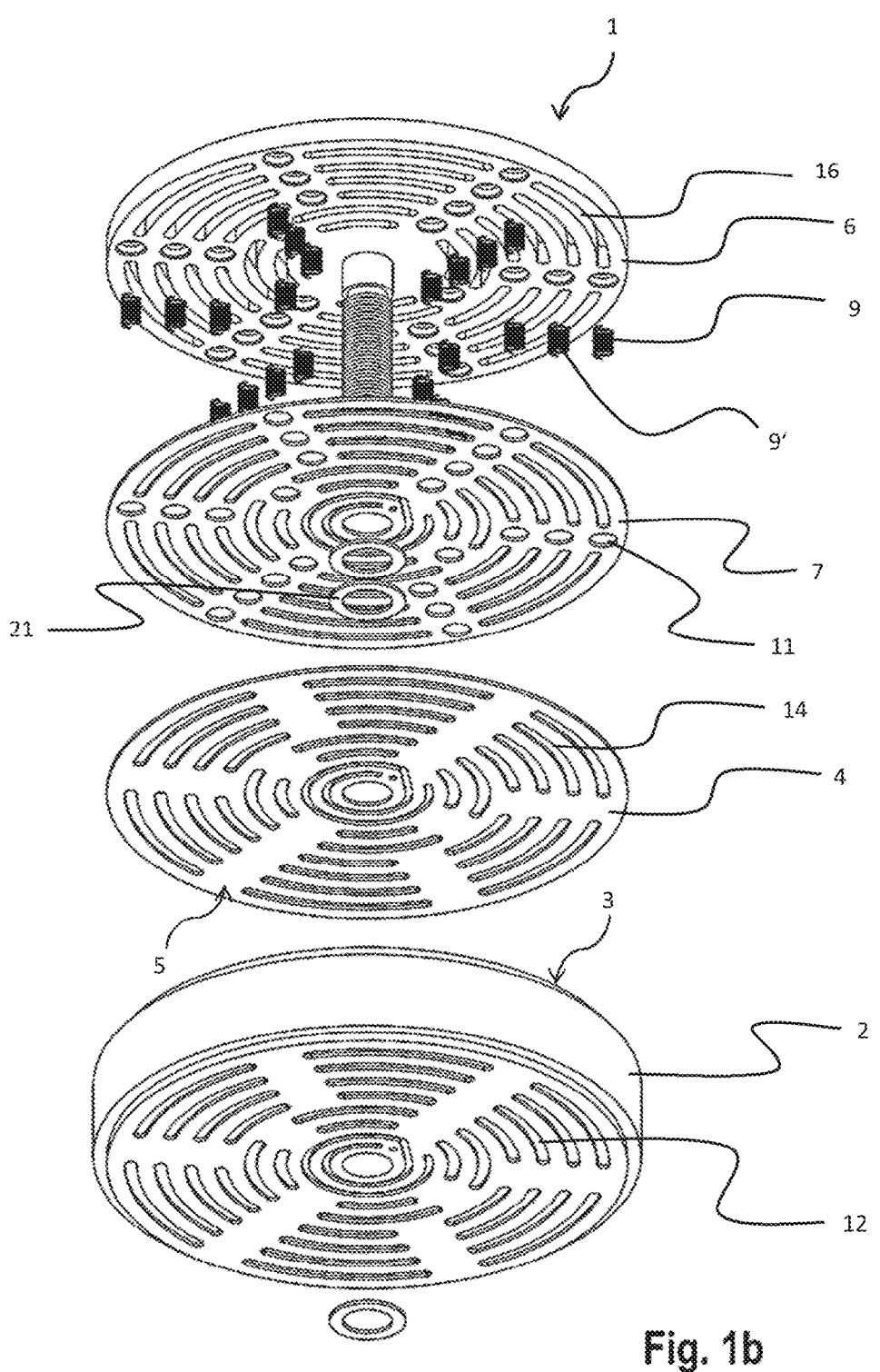
Figure 1C:
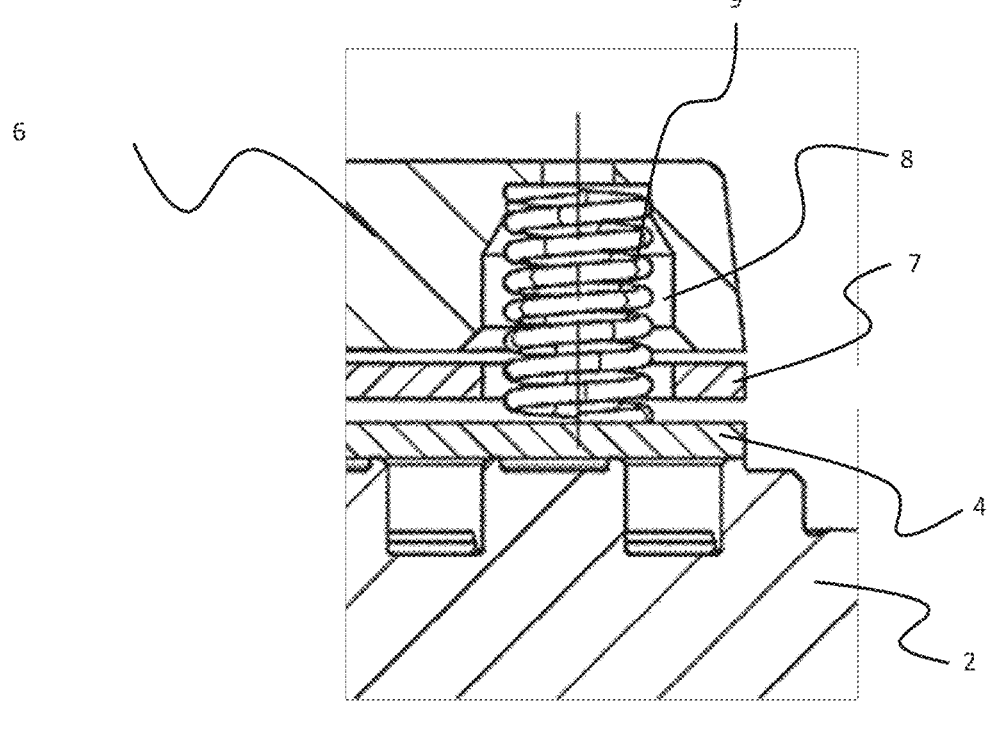
Figure 2:
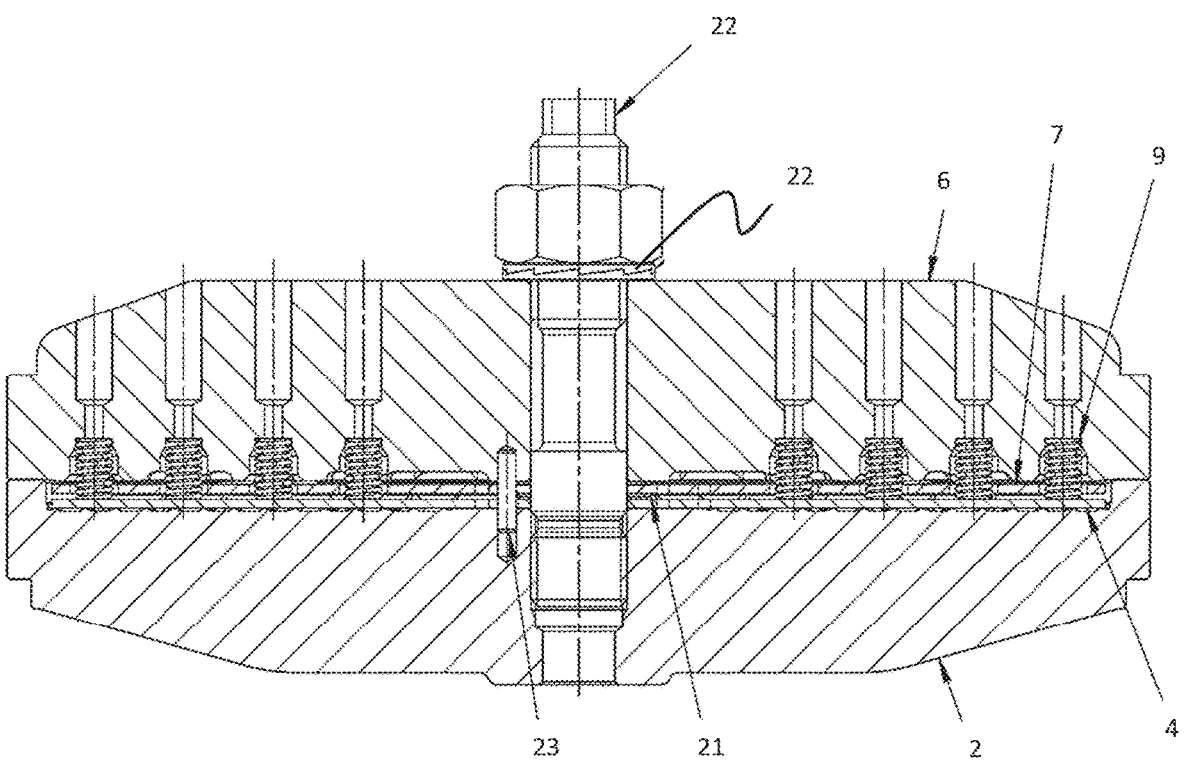
Figure 3:
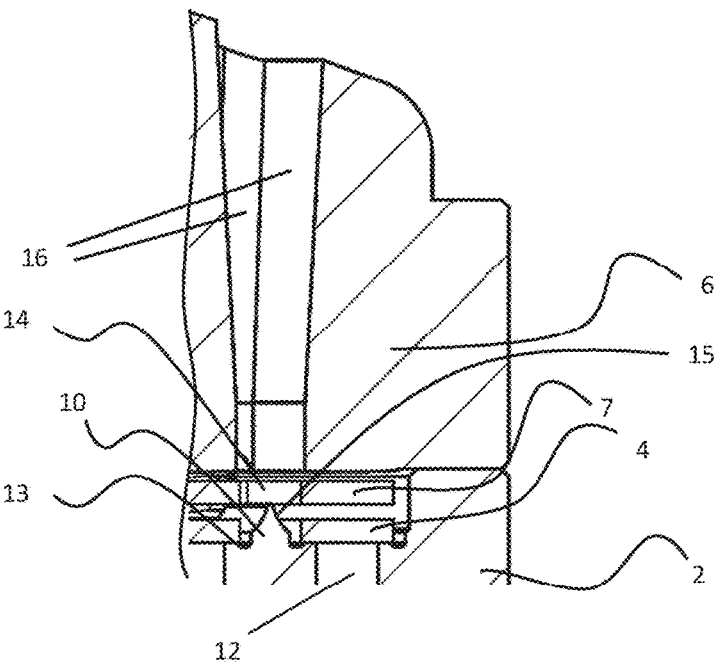
Figure 4:
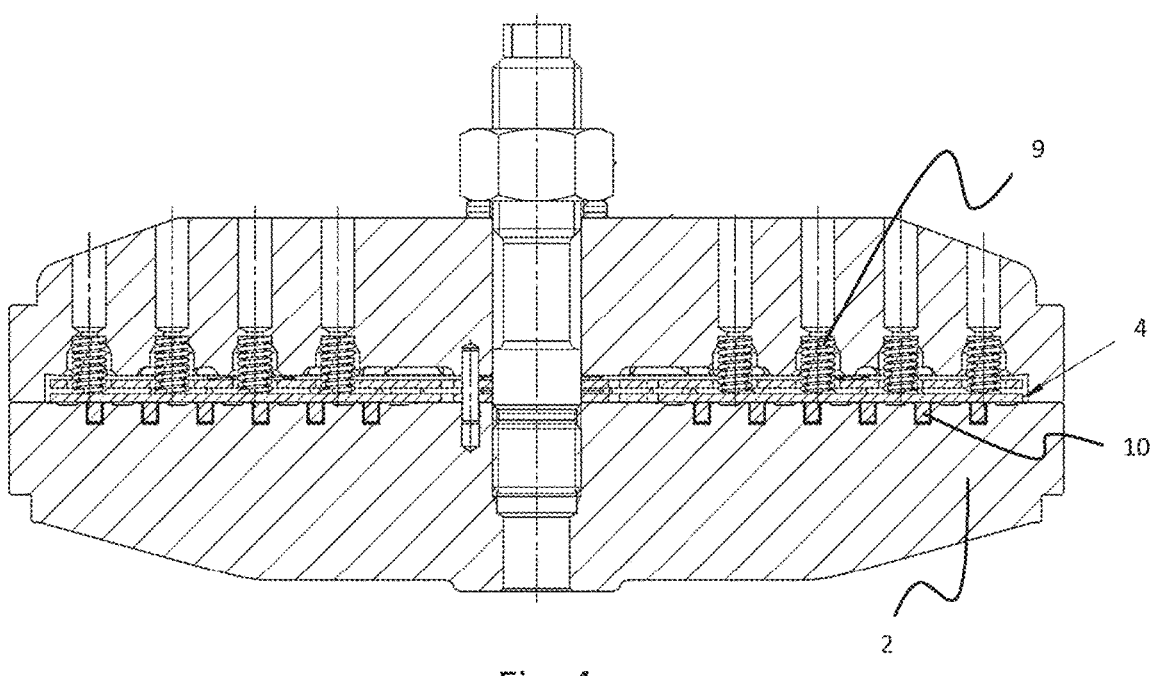
Figure 5:
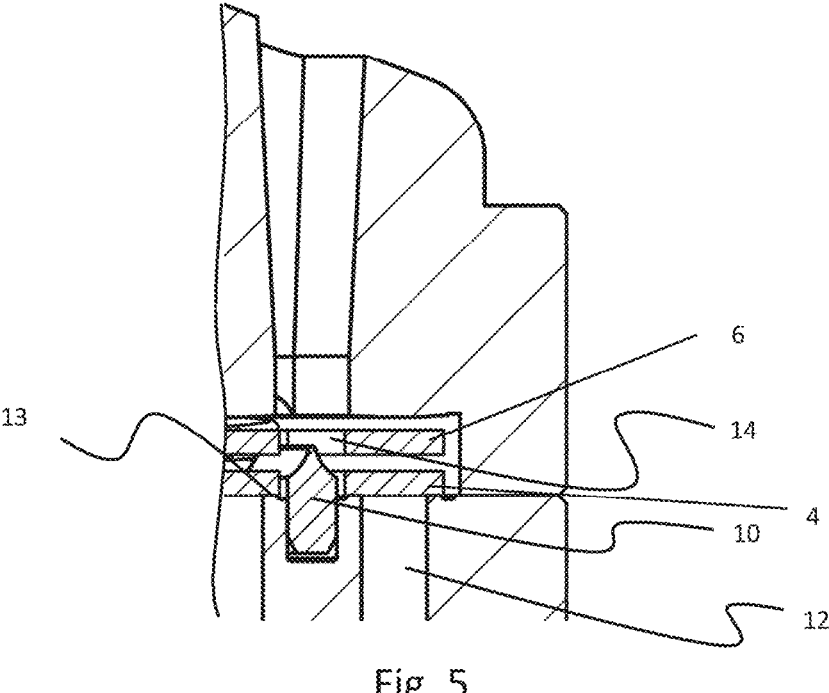

It shows:

FIG. 1A Cross-section of a known plate valve (state of the art);

FIG. 1B Perspective exploded view of a known plate valve (state of the art);

FIG. 1C Cross-section through a known plate valve (state of the art), in detail;

FIG. 2 Cross-section through a plate valve according to one embodiment of the invention;

FIG. 3 Cross-section through a plate valve according to one embodiment of the invention, in detail;

FIG. 4 Cross-section through a plate valve according to one embodiment of the invention;

FIG. 5 Cross-section through a plate valve according to one embodiment of the invention, in detail;

FIGS. 1A to 1C show a valve for a piston compressor, as it is known in the prior art. The valve 1 has a valve seat 2 with a plurality of flow channels 12 which open into an end face 3 of the valve seat 2. The valve also has a valve plate 4, which has a planar sealing surface 5, which is designed to control the flow channels 12 of the valve seat 2. The valve plate 4 extends in a plane parallel to the end face of the valve seat.

The valve seat 2 and the valve plate 4 have the shape of annular plates and are arranged concentrically. FIG. 1B shows that the flow channels 12 of the valve seat 2 and the passage openings 14 of the valve plate 4 are spatially offset from each other. Specifically, in the plan view (not shown) it can be seen that the slots are in the form of circular arcs concentric to the central axis. The arcs do not run around the entire circumference of the circle.

FIG. 1B also shows a catcher 6, which is arranged in such a way that the valve plate 4 extends between the valve seat 2 and the catcher 6. The catcher 6 has a slot pattern of passage channels 16, which corresponds to that of the passage openings 14 of the valve plate 4. The valve comprises a plurality of springs 9,9' arranged on the catcher 6 to move the valve plate 4 against the end face 3 of the valve seat 2. Specifically, the springs 9, 9' are arranged in recesses 8 of the catcher 6, which is visible in FIG. 1C. Finally, FIG. 1B also shows a damper plate 7 extending between the valve plate 4 and the catcher 6 in a plane parallel to the end face 3 of the valve seat 2, with the springs 9, 9' projecting through holes 11 in the damper plate 7 in order to load the valve plate 4 against the end face 3 of the valve seat 2.

The central axis, with respect to which the ring plates are arranged concentrically, is formed by a central screw 22. The central screw 22 projects as a catcher hub against the valve seat 2. The valve is stabilized by wedge lock washers 20, and the valve and damper plates can be spaced apart from each other by lifting washers 21. A pin 23 can be used to prevent unintentional rotation of the various ring plates.

FIG. 2 shows an axial section through a valve according to the invention in the area of a row of coil springs 9, 9'. The upper ends of the coil springs 9, 9' are each fastened in a blind bore of the catcher 6. The other, lower end of the coil spring 9, 9' presses the valve plate 4 against any gas pressure or vacuum in the direction of the valve seat 2. A damper plate 7 with a hole 11 through which the springs 9, 9' protrude is also shown.

FIG. 3 shows a radial section through a valve 1 according to the invention, now in the area of a flow channel 12 of the valve seat 2 and a radially offset passage opening 14 in the valve plate 4 and flow channel 16 of the catcher 6. The damper plate 7 also has the slot pattern of the valve plate 4 and catcher 6. It can be seen that a projection 10 is arranged on the end face 3 of the valve seat. The valve is shown in a closed state. The planar sealing surface 5 of the valve plate 4 rests in some areas on the face 3 of the valve seat 2 so that the contact areas 13 extend perpendicular to the flow channels 12 of the valve seat 2.

In the embodiment shown, the projection 10 protrudes through the valve plate 4 but not through the damper plate 7 when the valve is closed. However, other embodiments are also conceivable. It is not shown here that the passage openings 14 of the valve plate 4 are designed as circular arc-shaped slots and the projections 10 on the end face 3 of the valve seat 2 are designed as corresponding circular arc-shaped projections. This variant is preferred for an annular valve as shown in FIG. 1B.

FIG. 3 then shows that the projection 10 tapers in radial cross-section towards the valve plate 4 and specifically tapers over concave side curvatures 15, i.e. the slope of each tapering side becomes steeper towards the valve plate 4. The projection 10 is formed in one piece with the valve seat 2.

FIG. 4 shows an axial section through a valve according to the invention in the area of a row of coil springs 9. In this embodiment, the projections 10 are designed as parts that can be inserted into the valve seat 2 and removed from the valve seat 2. These are ring-shaped, separate parts which are fitted into corresponding grooves of the valve seat 2 in a friction-locked and replaceable manner.

In the detailed view of FIG. 5, it can be seen that the projections 10 also taper over concave side curvatures in radial section, at least in the area of a passage opening 14 of the valve plate 4.

The invention claimed is:

1. A valve for a piston compressor, comprising
a valve seat with a plurality of flow channels that open into an end face of the valve seat;
a valve plate having a planar sealing surface which is designed to control the flow channels of the valve seat;
wherein the valve plate extends in a plane parallel to the end face of the valve seat, is arranged concentrically to the valve seat and has passage openings which are spatially offset relative to the flow channels of the valve seat,
wherein
at least one projection is arranged on the end face of the valve seat which, at least in a closed valve state, projects into a passage opening of the valve plate, wherein the at least one projection is designed as a part that can be inserted into the valve seat and removed from the valve seat, the at least one projection is made of plastic, and the valve seat is made of metal.

2. The valve according to claim 1, further comprising a catcher which is arranged such that the valve plate extends between the valve seat and the catcher.

3. The valve according to claim 2, wherein springs are arranged on the catcher to load the valve plate against the end face of the valve seat.

6

4. The valve according to claim 2, further comprising an auxiliary plate extending between the valve plate and the catcher in a plane parallel to the end face of the valve seat.

5. The valve according to claim 4, wherein springs that are arranged on the catcher to load the valve plate against the end face of the valve seat protrude through holes in the auxiliary plate to load the valve plate against the end face of the valve seat.

6. The valve according to claim 4, wherein the passage openings of the valve plate are formed as arcuate slots and the projections on the end face of the valve seat are formed as corresponding arcuate projections.

7. The valve according to claim 1, wherein in the closed valve state, the planar sealing surface of the valve plate rests in contact areas on the end face of the valve seat, wherein the contact areas extend perpendicularly to the flow channels of the valve seat.

8. The valve according to claim 1, wherein the at least one projection is a plurality of projections arranged on the end face of the valve seat, which at least in the closed valve state each project into a corresponding passage openings of the valve plate.

9. The valve according to claim 1, wherein the at least one projection has a cross-section which tapers towards the valve plate.

10. A piston compressor comprising a valve according to claim 1.

11. A method of operating a valve for a reciprocating compressor, the valve comprising a valve seat and a valve plate,
wherein the valve seat has a plurality of flow channels and an end face into which the flow channels open, and the valve plate has passage openings which are spatially offset relative to the flow channels of the valve seat,
wherein in a closed valve state the valve plate blocks the flow channels and releases them in an open valve state, and wherein the valve plate assumes the open state when it automatically lifts off the valve seat due to a fluid pressure applied to the valve, so that fluid flows through the flow channels of the valve seat and downstream through the passage openings of the valve plate, wherein
fluid is directed via at least one projection, arranged on the valve plate of the valve seat, into a passage opening of the valve plate, wherein the at least one projection is designed as a part that can be inserted into the valve seat and removed from the valve seat, the at least one projection is made of plastic, and the valve seat is made of metal.

12. The method according to claim 11, wherein the fluid is directed via the at least one projection, and the at least one projection is a plurality of projections arranged on the end face of the valve seat into a respective corresponding passage opening of the valve plate.

13. The method according to claim 11, wherein the fluid is directed into at least one passage opening of the valve plate via at least one projection tapering towards the valve plate.

\* \* \* \* \*